(12) United States Patent
Nunez

(10) Patent No.: US 7,798,292 B2
(45) Date of Patent: Sep. 21, 2010

(54) ENGINE NOISE BAFFLE FOR TRACTOR BRAKE SHAFT

(75) Inventor: Dimitri Nunez, Waxhaw, NC (US)

(73) Assignee: Deere & Company, Moline, IL (US)

( * ) Notice: Subject to any disclaimer, the term of this patent is extended or adjusted under 35 U.S.C. 154(b) by 597 days.

(21) Appl. No.: 11/371,770

(22) Filed: Mar. 9, 2006

(65) Prior Publication Data

US 2007/0209471 A1 Sep. 13, 2007

(51) Int. Cl.
B60T 7/04 (2006.01)
G05G 25/02 (2006.01)

(52) U.S. Cl. .................. 188/16; 74/480 R; 74/512; 74/560; 74/566; 180/84; 180/90.6; 277/345

(58) Field of Classification Search ............... 74/512, 74/560, 562, 18; 180/89.12, 90, 90.6, 275; 403/134; 464/171, 173; 188/106 R, 106 P; 384/277, 438, 466, 624; 277/423, 634, 916
See application file for complete search history.

(56) References Cited

U.S. PATENT DOCUMENTS

| | | | | | |
|---|---|---|---|---|---|
| 2,030,272 A | * | 2/1936 | Schnell | .................. | 188/78 |
| 2,299,638 A | * | 10/1942 | Marvin | .................. | 277/379 |
| 2,485,759 A | * | 10/1949 | Miller | .................. | 74/481 |
| 2,753,008 A | * | 7/1956 | Peirce | .................. | 180/90.6 |
| 2,806,720 A | * | 9/1957 | Meyer | .................. | 277/392 |
| 3,748,923 A | | 7/1973 | Babbitt, Jr. et al. | ............ | 74/566 |
| 3,844,374 A | | 10/1974 | Downey | .................. | 180/90.6 |
| 3,935,932 A | * | 2/1976 | Moorhouse | .................. | 192/13 R |
| 4,033,425 A | | 7/1977 | Mueller, Jr. | .................. | 180/77 R |
| 4,043,217 A | * | 8/1977 | Kleist | .................. | 74/470 |
| 4,126,202 A | | 11/1978 | Hern | .................. | 180/89.12 |
| 4,248,331 A | * | 2/1981 | Behrens | .................. | 192/13 R |
| 4,283,965 A | | 8/1981 | Hansen | .................. | 74/482 |
| 4,351,198 A | | 9/1982 | Hansen | .................. | 74/482 |
| 4,450,927 A | * | 5/1984 | Hirata et al. | .................. | 180/330 |
| 4,702,483 A | * | 10/1987 | Ukai et al. | .................. | 277/636 |
| 4,759,417 A | * | 7/1988 | Wanie et al. | .................. | 180/6.34 |
| 4,932,275 A | | 6/1990 | Bischoff et al. | .................. | 74/18.2 |
| 6,068,675 A | * | 5/2000 | Tsuda et al. | .................. | 55/385.3 |
| 6,164,396 A | * | 12/2000 | Matsufuji | .................. | 180/6.34 |
| 6,321,893 B1 | | 11/2001 | Muhlert et al. | .................. | 192/99 |
| 6,981,737 B2 | | 1/2006 | Welsh | .................. | 296/208 |
| 2005/0230198 A1 | * | 10/2005 | Rodriguez et al. | .................. | 188/106 P |

* cited by examiner

*Primary Examiner*—Richard W Ridley
*Assistant Examiner*—Thomas Diaz

(57) ABSTRACT

An engine noise engine noise baffle for a tractor brake shaft that extends laterally through openings in an engine compartment wall. The engine noise engine noise baffle has a cup-shaped portion pressed against the interior surface of the engine compartment wall, and a sleeve portion around the tractor brake shaft. The engine noise engine noise baffle has freedom of rotation with respect to the engine compartment wall. The engine noise engine noise baffle helps block and shield the operator cab from high engine temperatures, engine noise, dirt and dust, and engine fumes.

8 Claims, 5 Drawing Sheets

ENGINE NOISE BAFFLE FOR TRACTOR BRAKE SHAFT

FIELD OF THE INVENTION

The present invention relates to tractor brake systems and more particularly to an engine noise baffle for a tractor brake shaft that extends through an engine compartment or firewall.

BACKGROUND OF THE INVENTION

Tractor brake systems may include linkages between the left and right brake pedals and the left and right wheel brakes respectively. The linkages allow the left brake pedal to apply the left wheel brake, and the right brake pedal to apply the right wheel brake. One such linkage may be a hydraulic linkage which may include hoses, couplings and seals between each brake pedal and brake. Hydraulic brake linkages are costly to manufacture and assemble, and the seals and other components may deteriorate after extended use.

Mechanical linkages have been used between the left and right brake pedals and brakes. Mechanical linkages for a tractor brake system may be substantially lower in cost than hydraulic linkages. If a mechanical linkage includes a brake shaft that extends laterally across the vehicle, it may be necessary for the brake shaft to extend through an opening in the engine compartment or firewall. Openings in the engine compartment or firewall may compromise their effectiveness to block and shield the tractor cab from engine noise, as well as high engine temperatures, dirt and engine fumes.

A tractor brake system may include brake pedals for each of the left and right wheel brakes, a brake shaft extending laterally across the tractor, and mechanical linkages to each of the brakes. Openings for the brake shaft through the wall of an engine compartment or firewall may allow engine noise, as well as heat, dirt and fumes from the engine to enter the tractor cab area. It is desirable to improve the tractor cab working environment by minimizing engine noise from the engine to the cab, and reducing heat, dirt and fumes that may be transmitted from the engine to the cab.

In the past, sealing assemblies and bearings have been used to fit around components extending through openings in engine compartments or firewalls. For example, U.S. Pat. No. 3,844,374 relates to a seal assembly with three main elements arranged axially on a control link: a relatively thick washer-like member, a substantially hemispherical seal member, and a compression coil spring. U.S. Pat. Nos. 4,283,965 and 4,351,198 relate to sound attenuating bearings constructed of bushings fitted to the shaft of a hand and foot throttle control extending through the firewall. U.S. Pat. No. 4,033,425 relates to a mounting assembly which includes a grommet which has an annular groove and a central opening which supports a bearing element.

Prior art sealing devices and bearings are not effective to reduce or minimize engine noise, or to reduce heat, dirt and fumes passing through a gap around a brake shaft that extends through an engine compartment or firewall. Seals that are held against an engine compartment or firewall by clamps or springs may have a limited life and consume excessive space that is very limited within an engine compartment. Sound attenuating bearings are costly and require precise positioning and close dimensional tolerances within openings in an engine compartment or firewall. Bearings also may limit the lateral movement and/or rotation of a brake shaft within the opening. Rubber grommets may not provide a sufficiently strong seal to seal the gap between a brake shaft and opening in an engine compartment or firewall. An improved device is needed for minimizing engine noise, and reducing heat, dirt and fumes passing from an engine, around a brake shaft extending through the engine compartment or firewall, into a tractor cab.

SUMMARY OF THE INVENTION

The present invention provides an engine noise baffle that fits around a brake shaft extending laterally through an engine compartment or firewall. The engine noise baffle includes a cup-shaped portion that is pressed against the engine compartment wall, yet allows the engine noise baffle to rotate with respect to the wall. The engine noise baffle improves a tractor cab working environment by minimizing noise transmitted from the engine to a cab through openings in the engine compartment or firewall around a brake shaft, and reducing heat, dirt and fumes from entering the cab.

DESCRIPTION OF THE PREFERRED EMBODIMENT

Figure 1:
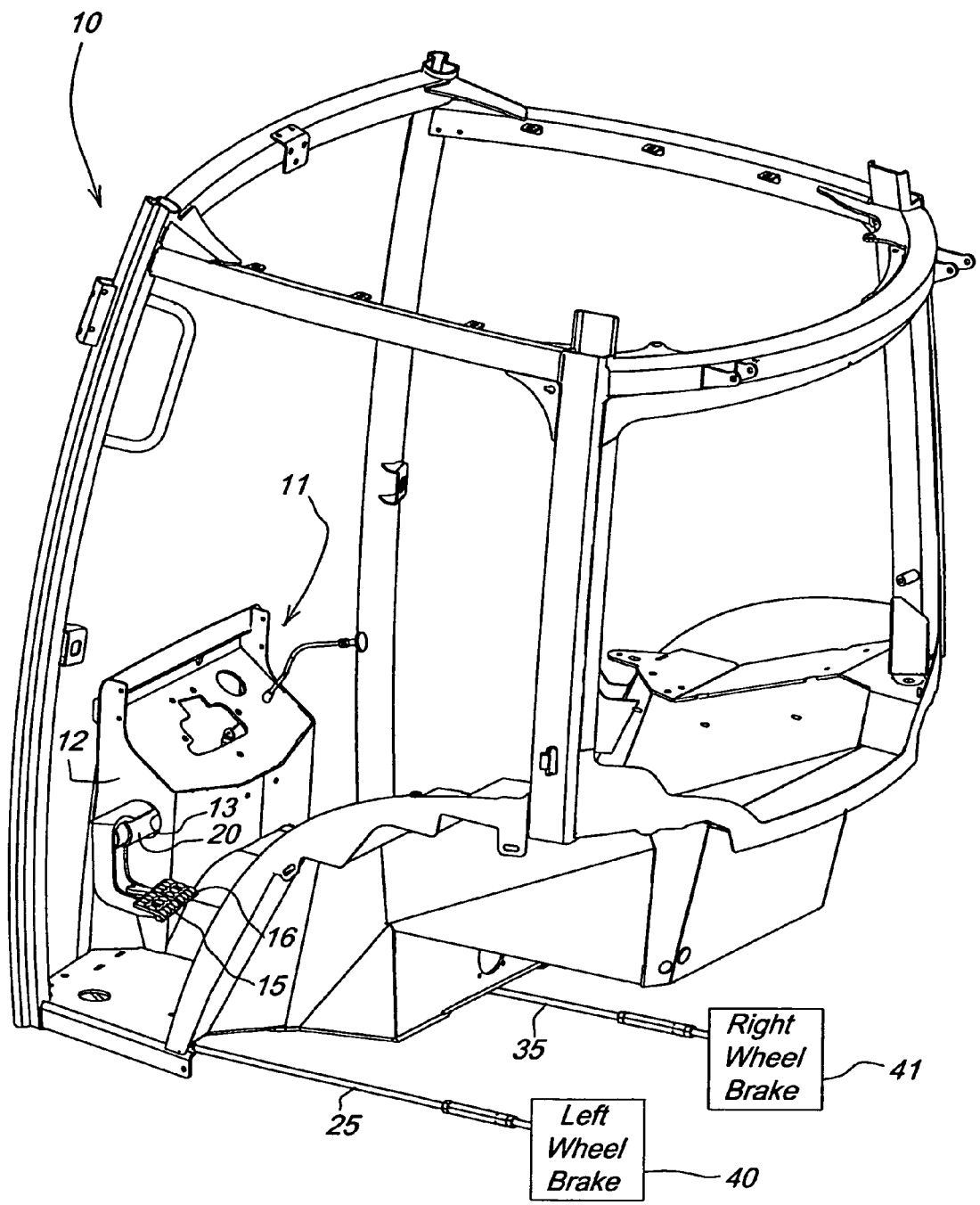
FIG. 1 is a perspective view of the frame of a tractor cab and rear portion of an engine compartment or firewall including a brake system with an engine noise baffle according to a first embodiment of the invention.

In FIG. 1, tractor cab frame 10 is shown with engine compartment or firewall 11 to provide a barrier between the engine and cab to shield the cab from engine noise, as well as heat, dirt and fumes. The engine compartment or firewall may include side panel 12 with opening 13 through which brake shaft 20 extends. The tractor cab frame may include a roll over protection device and operator station or seat. FIG. 1 also shows left and right brake pedals 15, 16, and rods 25, 35 that may be moved forwardly by application of pressure to each brake pedal to engage the left and right wheel brakes 40, 41.

Figure 2:
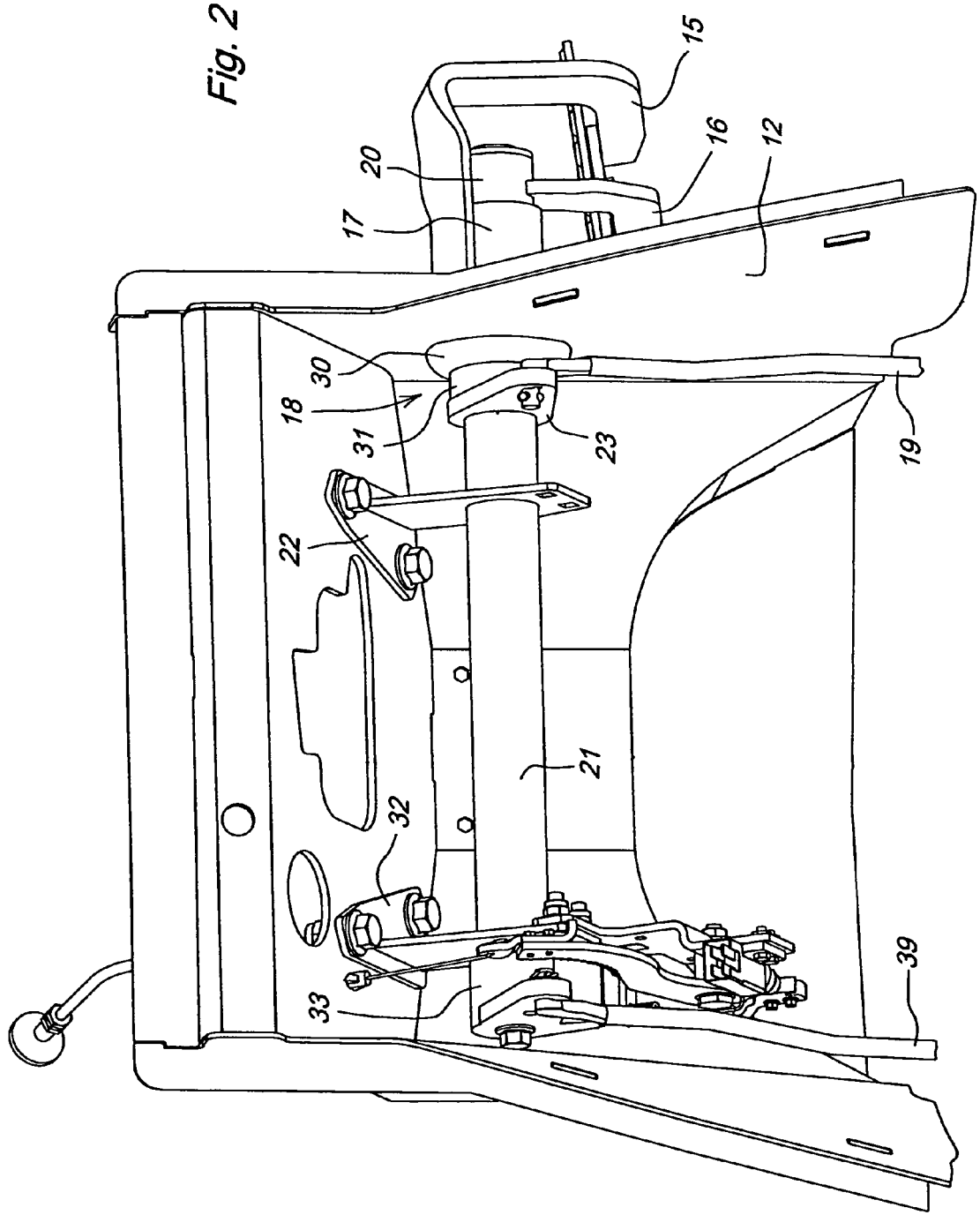
FIG. 2 is a front perspective view of an engine firewall showing a brake system with an engine noise baffle according to a first embodiment of the invention.
Figure 3:
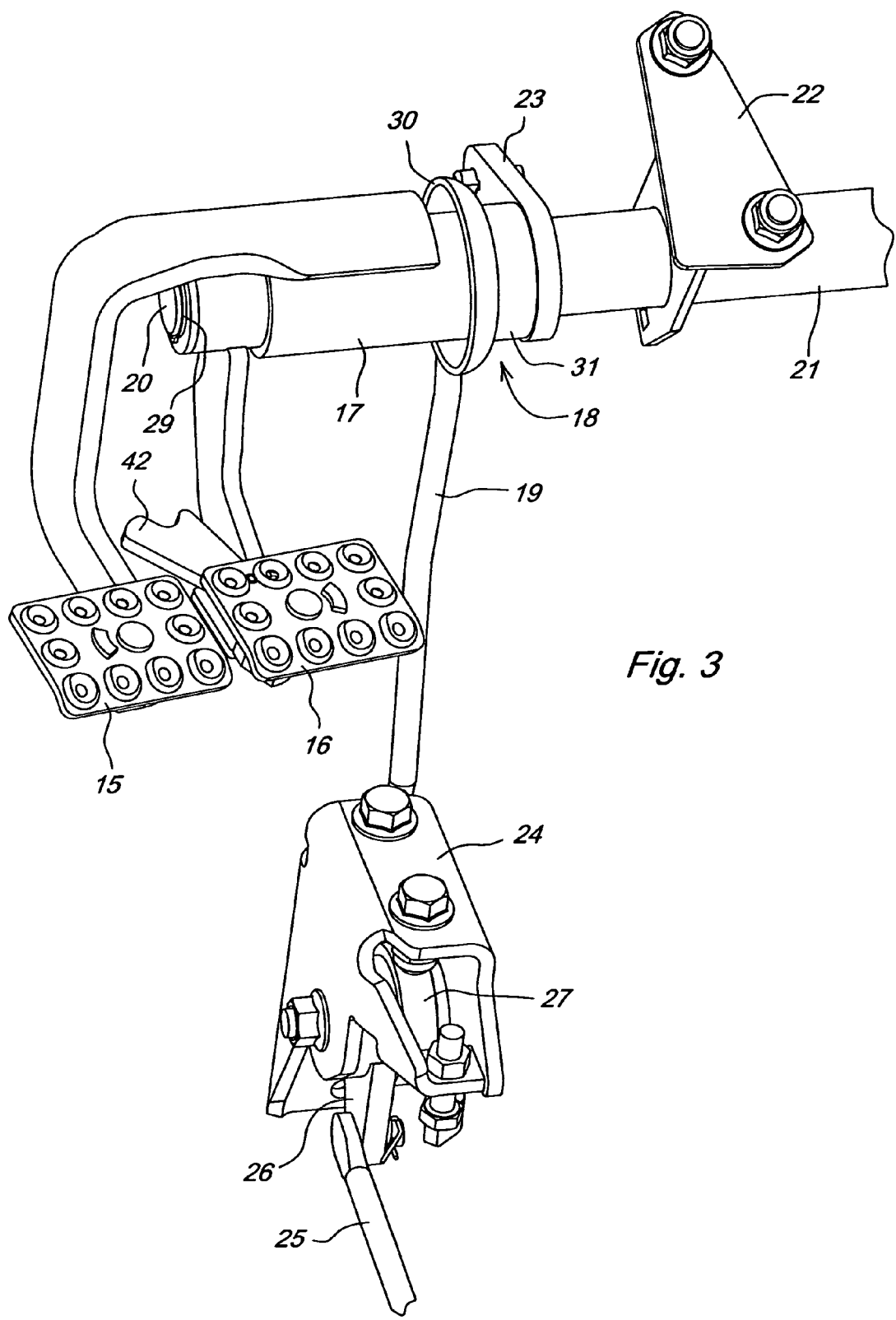
FIG. 3 is a perspective view of a portion of the brake system with an engine noise baffle according to a first embodiment of the invention.
Figure 4:
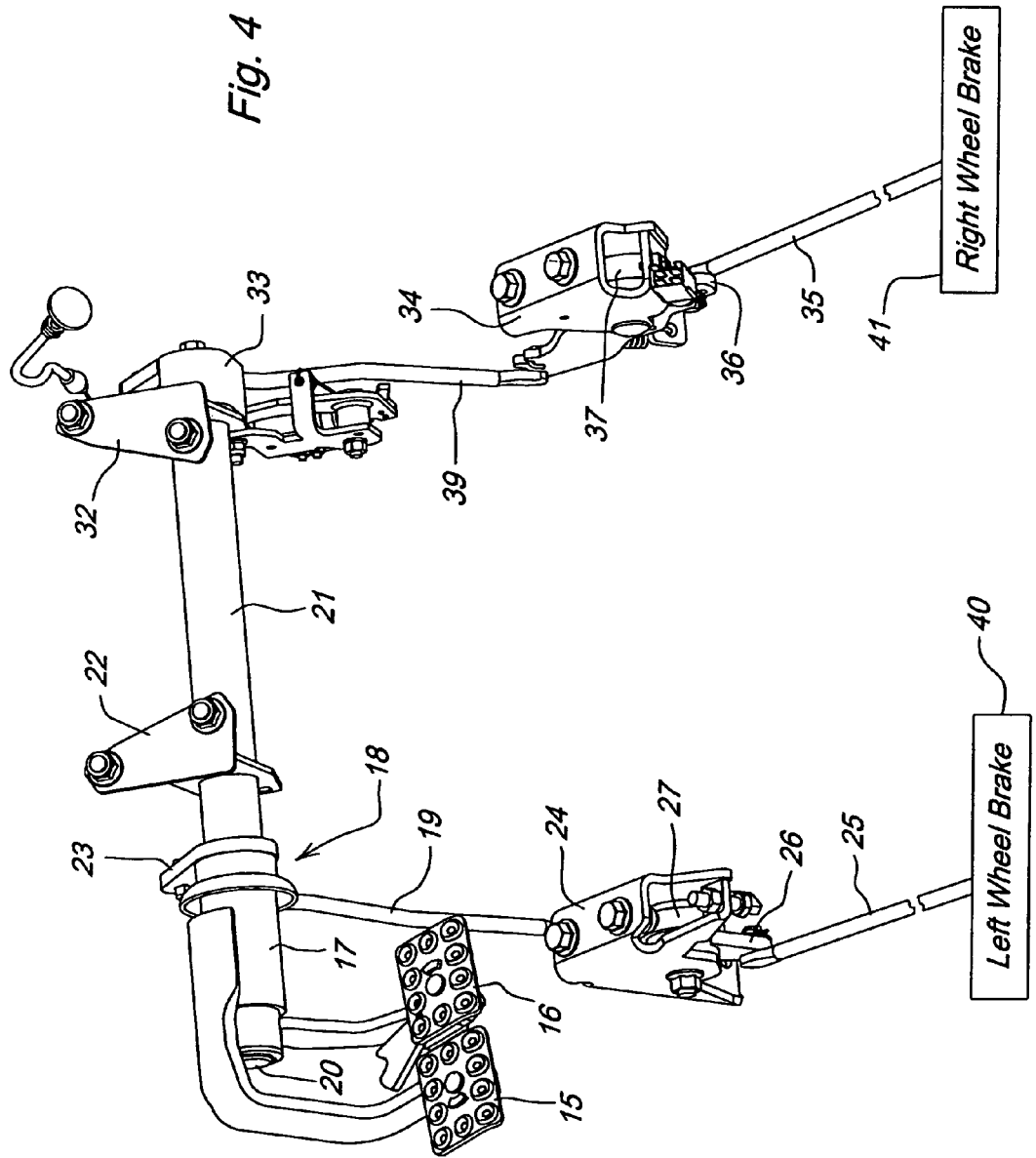
FIG. 4 is a perspective view of a brake system with an engine noise baffle according to a first embodiment of the invention.
Figure 5:
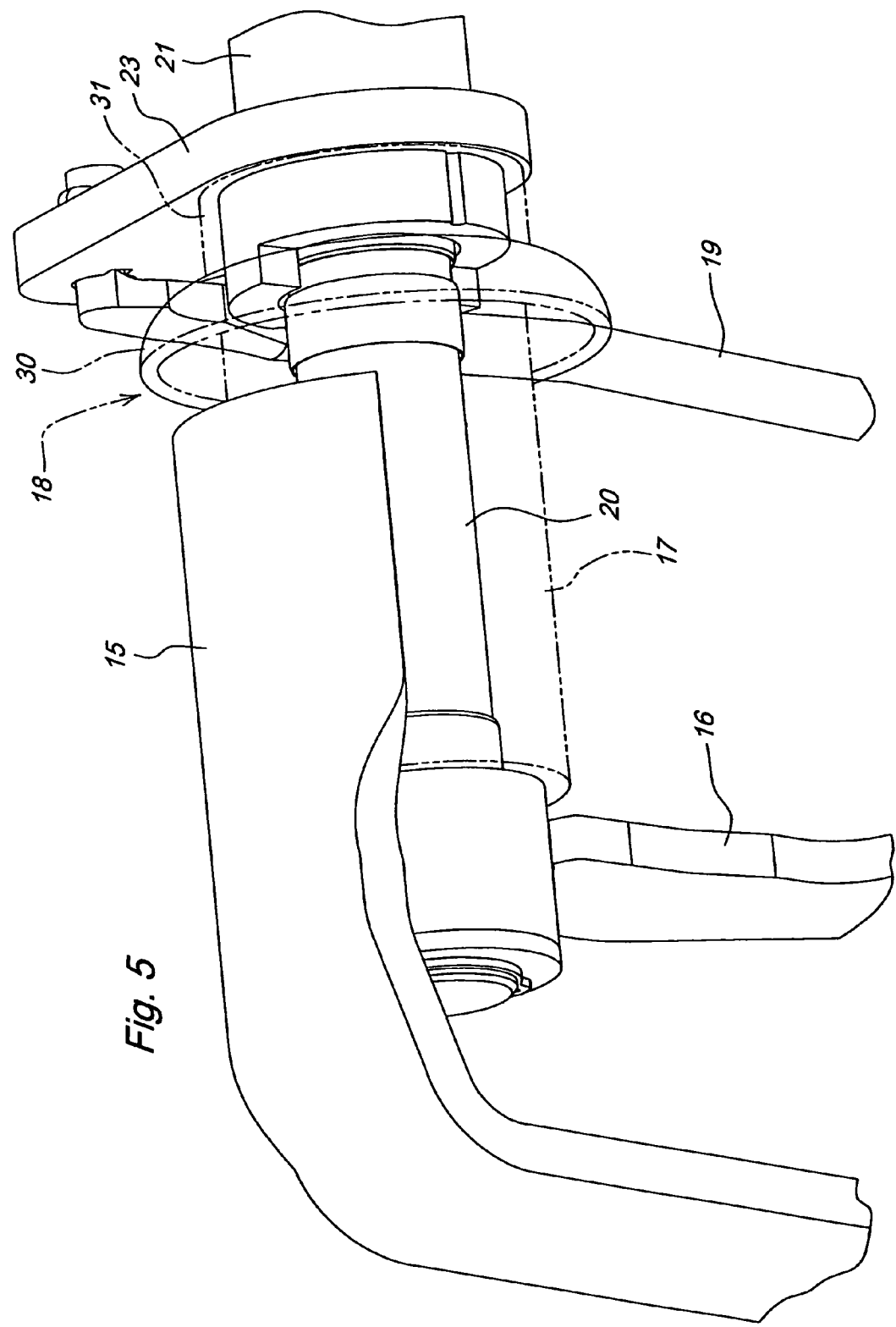
FIG. 5 is a close up view, partially in section, of a brake shaft and engine noise baffle according to a first embodiment.

Now referring to FIG. 2, according to a first embodiment of the invention, brake shaft 20 extends through an opening in side panel 12 of the engine compartment or firewall. Brake shaft 20 may extend laterally through the opening and into support tube 21. Support tube 21 may be bolted or welded to the engine compartment with left and right support mounts or brackets 22, 32. Brake shaft 20 may rotate and turn on its axis inside support tube 21. Brake pedals 15, 16 may be connected independently to sleeve 17 and shaft 20.

Referring now to FIGS. 2-5, in one embodiment, left brake pedal 15 may have an arm welded or otherwise fastened to the outside diameter of outer sleeve 17. One end of outer sleeve 17 may be coupled to left front bell crank 23 by a step or notch, for example. The operator may apply the left wheel brake by depressing left brake pedal 15, causing sleeve 17 to pivot and left front bell crank 23 to turn. Turning of left front bell crank 23 causes left front rod 19 to move forwardly, and cause left rear bell crank 26 to turn. Left rear bell crank 26 and spacer 27 may be pivotably mounted together in left bracket 24. Left rear bell crank 26 may be connected to left wheel brake 40 by left rear rod 25.

In one embodiment, right brake pedal 16 may have an arm welded or otherwise fastened to shaft 20 which extends through the opening in the engine compartment or firewall and into support tube 21. One or more bushings may be positioned in support tube 21 around shaft 20. The operator may apply the right wheel brake by depressing right brake pedal 16, causing shaft 20 to turn within the support tube, and causing right front bell crank 33 to turn. Turning of right front bell crank 33 urges right front rod 39 forwardly, causing right rear bell crank 36 to turn. Right rear bell crank 36 and spacer 37 may be pivotably mounted together in right bracket 34. Right bell crank 36 may be connected to right wheel brake 41 through right rear rod 35.

In one embodiment, the left wheel brake and right wheel brake each also may be applied by service brake handles. Additionally, if desired, the left and right brake pedals may be releasably interlocked together with pivoting catch 42 to permit application of both brakes simultaneously.

In one embodiment, engine noise baffle 18 may be mounted on brake shaft 20 at an opening in side panel 12 of engine compartment or firewall 11. Engine noise baffle 18 may be pressed tightly against the interior surface of the engine compartment or firewall but may still be allowed to rotate or turn with respect to the wall. Engine noise baffle 18 may include cup-shaped portion 30 and sleeve portion 31. The internal diameter of the engine noise baffle may be the same or slightly larger than the outer diameter of brake shaft 20. For example, the internal diameter of the engine noise baffle may be 1⅛ inches.

In one embodiment, cup-shaped portion 30 of engine noise baffle 18 may be compressed axially into place between engine compartment or firewall 11 and left front brake bell crank 23. Axial compression of the engine noise baffle may expand the diameter of the cup-shaped portion. As a result, the engine noise baffle may block noise, heat, etc. from entering the cab yet provide rotational freedom to brake shaft 20, as well as sleeve 17 and bell crank 23. No clamps are needed, and engine noise baffle 18 can spin freely on shaft 20. The engine noise baffle does not provide a complete a fluid seal, but may be formed from a rubber compound able to withstand high temperatures. For example, the engine noise baffle may be EPDM rubber that can tolerate engine compartment temperatures in this region of over 300 degrees F.

Having described the preferred embodiment, it will become apparent that various modifications can be made without departing from the scope of the invention as defined in the accompanying claims.

The invention claimed is:

1. A tractor brake system comprising:
 a left brake pedal and a right brake pedal; each brake pedal connected to a rotatable part of a brake shaft extending laterally through an opening in the wall of an engine compartment; the brake shaft having a rotatable inner shaft and an outer sleeve rotatable independently of the inner shaft;
 a left bell crank and a right bell crank; one of the bell cranks connected to the inner shaft and the other bell crank connected to the outer sleeve;
 a first linkage between the left bell crank and a left wheel brake, and a second linkage between the right bell crank and a right wheel brake; and
 a one-piece entirely rubber engine noise baffle positioned within the engine compartment against an opening in the wall and around the brake shaft and including a cup shaped portion compressed axially between the wall of the engine compartment and one of the bell cranks; the engine noise baffle rotatable with respect to the wall and the brake shaft.

2. The tractor brake system of claim 1 wherein the brake shaft extends through a first wall and a second wall of the engine compartment.

3. The tractor brake system of claim 1 wherein the engine noise baffle includes a cup shaped portion and a sleeve portion.

4. An apparatus comprising:
 a brake shaft having an axis extending laterally through openings in a first wall and a second wall of a tractor engine compartment; the brake shaft including an inner shaft connected to a first brake pedal and an outer sleeve connected to a second brake pedal; the inner shaft and outer sleeve being independently pivotable to apply a first brake and a second brake; and
 a one-piece entirely rubber engine noise baffle inside the tractor engine compartment around the brake shaft at one of the openings and having a cup shaped portion compressed axially between one of the tractor engine compartment walls and a bell crank pivotable on the brake shaft; the engine noise baffle being rotatable with respect to the walls, the inner shaft and outer sleeve.

5. The apparatus of claim 4 further comprising a first brake pedal fastened to the inner shaft to apply the first brake and a second brake pedal fastened to the outer sleeve to apply the second brake.

6. The apparatus of claim 4 wherein the engine noise baffle includes a sleeve portion around the brake shaft.

7. The apparatus of claim 6 wherein the sleeve portion has an inner diameter greater than the outer diameter of the brake shaft.

8. The apparatus of claim 6 wherein the cup-shaped portion has an outer diameter that expands upon axial compression of the engine noise baffle between the tractor engine compartment wall and the bell crank.

* * * * *